United States Patent [19]

Dumont et al.

[11] Patent Number: 5,642,302

[45] Date of Patent: Jun. 24, 1997

[54] METHOD AND APPARATUS FOR POSITIONING A HUMAN BODY

[75] Inventors: Daniel Dumont, St-Sauveur; Alain Laferriere, Notre-Dame de l'Ile Perrôt; Eric Guerard, Montréal, all of Canada

[73] Assignee: Banque de Developpement du Canada, Canada

[21] Appl. No.: 390,954

[22] Filed: Feb. 21, 1995

[51] Int. Cl.⁶ .................... G06F 19/00; G05B 23/02
[52] U.S. Cl. .................... 364/579; 297/DIG. 4; 128/845
[58] Field of Search ........................ 364/506, 508, 364/468, 413.01, 579, 512, 413.02; 73/862.625, 172, 379.01, 379.08, 379.09; 482/4; 297/61, 68, 70, 71, 284.3, 284.2, 400, DIG. 4, 284.4, 343; 128/774, 781, 845

[56] References Cited

U.S. PATENT DOCUMENTS

| | | | |
|---|---|---|---|
| 4,890,235 | 12/1989 | Reger et al. | 364/468 |
| 4,972,351 | 11/1990 | Reger et al. | 364/468 |
| 5,110,183 | 5/1992 | Jeanes, III | 297/343 |
| 5,403,251 | 4/1995 | Belsito et al. | 482/4 |
| 5,408,873 | 4/1995 | Schmidt et al. | 73/862.625 |
| 5,505,520 | 4/1996 | Frusti et al. | 297/284.4 |

*Primary Examiner*—Emanuel T. Voeltz
*Assistant Examiner*—M. Kemper
*Attorney, Agent, or Firm*—Hoffman, Wasson & Gitler

[57] ABSTRACT

A method and device for positioning a human body in a wheelchair or other support is provided. The method and device enables a user to modify and adjust various components to orient the seat to aid the posture of the user, by taking various measurements via sensors and controlling the position of the components to achieve an optimum configuration of the components to support the user.

24 Claims, 7 Drawing Sheets

METHOD AND APPARATUS FOR POSITIONING A HUMAN BODY

BACKGROUND OF THE INVENTION

1. Field of the Invention

The present invention relates to a method and device for positioning a human body in a wheelchair or other support. More particularly, the present invention relates to a seat which enables a user to modify and adjust various components to orient the seat to aid the posture of the user.

2. Description of the Prior Art

Maintaining a comfortable and useful seated posture for a long period of time can be difficult and may require special support. Disabled individuals who are confined or limited to a wheelchair are especially challenged to achieve a comfortable position. Appropriate posture is necessary to prevent pain, sores and injury such as deformity, retain good posture and improve the abilities of people restricted to wheelchairs.

U.S. Pat. No. 4,890,235, to Reger et al, pertains to a computer aided prescription of specialized seats for wheelchairs or other body supports. The system provides a surface which deforms to the shape of an object placed on it, and a sensor generates a force a distribution signal representing the force distribution along the surface. A patient is placed upon the seat causing deformation of the surface. The seat surface is then selectively varied in accordance with the signal from the sensor by manipulating multiple pneumatic actuators. Data generated by the system is transmitted to a fabrication unit which produces a cushion with the desired characteristics.

The Reger et al system however is only of limited use. The chair has sensors in only the seat and backrest with only one pneumatic actuator. The apparatus is designed to be controlled by others while the patient is seated, giving the patient no direct control of the process. The number of factors that need to be incorporated to obtain a comfortable seat for a patient are considerable, and the Reger et al system takes only a couple of factors into consideration. The human back is quite complex and a special support may be required, and for the head, pelvic region, thoracic region, butt, thighs and arms. While the Reger et al system measures a persons contours, such measurements are performed in a static state. There is no provision for moving various components relative to one another prior to taking measurements. Movement of the components relative to one another will affect the readings used in developing the measurements, and therefor need to be considered to produce an optimum chair or support.

SUMMARY OF THE INVENTION

These and other deficiencies of the prior art are addressed by the present invention which is directed to a method and apparatus for producing a seat or patient support which takes measurements from a footrest, the seat, an anterior wedge, the armrests, a pelvic rest, a thoracic rest, a headrest and a backrest.

It is an object of the present invention to over come the deficiencies of the existing system.

Another object is to provide a method and apparatus which has separate components to support a patient, each of which can be independently actuated, and from which positional readings can be derived.

Yet another object of the present invention is to provide a method and apparatus that can be controlled by the patient.

The present invention provides support for a patient's head, pelvic region, thoracic region butt, thighs and arms. Various components may be moved both angularly and linearly relative to one another prior to and subsequent to measurement and a chair or support is produced based upon the final measurement.

BRIEF DESCRIPTION OF THE DRAWINGS

These and other attributes of the present invention will be described with respect to the following drawings in which.

DETAILED DESCRIPTION OF THE INVENTION

Figure 2:
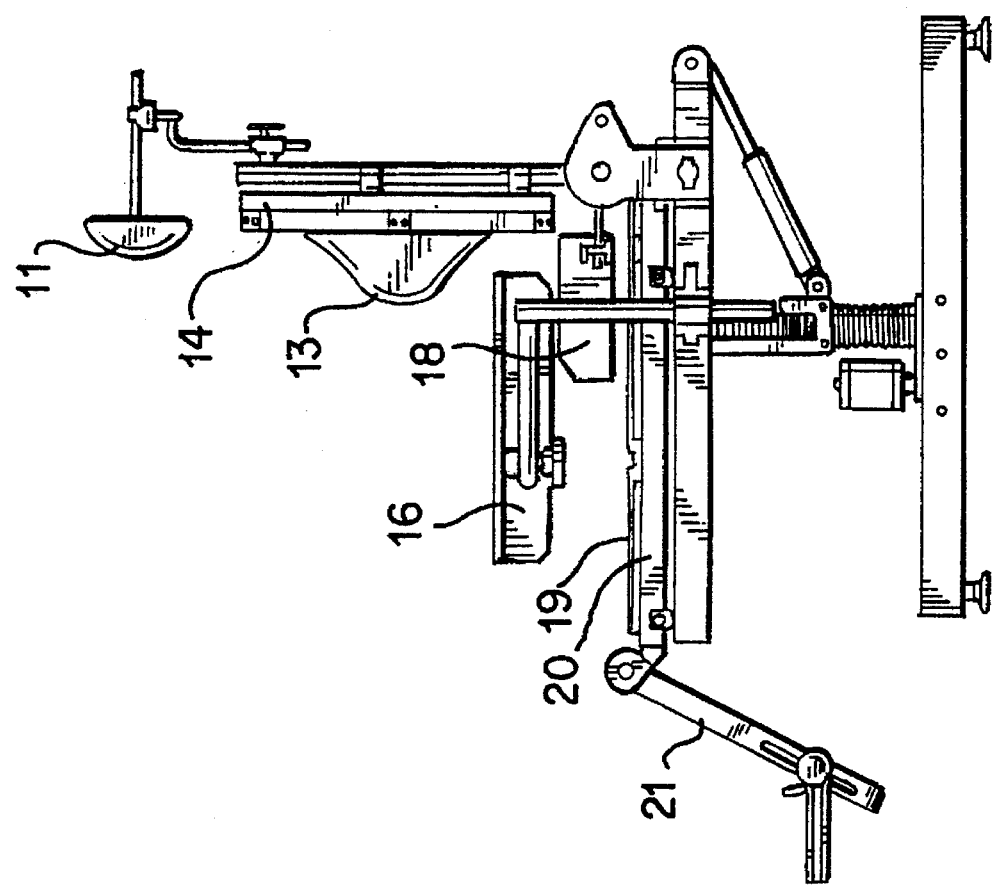
FIG. 2 is a side view of the chair shown in FIG. 1.
Figure 1:
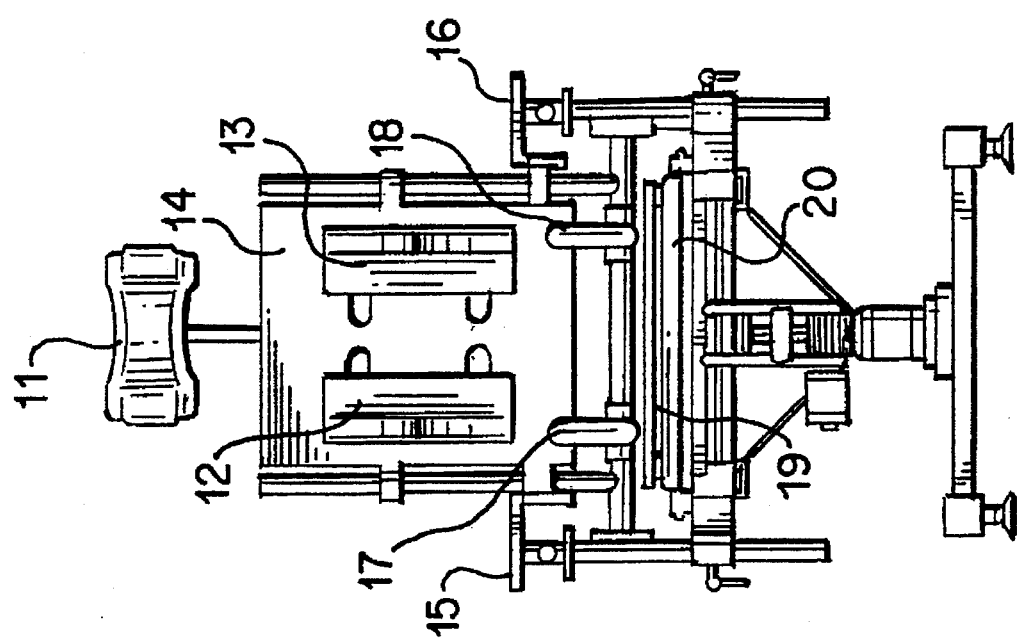
FIG. 1 is a front view of a chair according to the present invention.

Referring to FIGS. 1 and 2, the chair according to the present invention has a backrest 14 and a seat 20, connected to one another and angularly adjustable relative to each other. A left and right armrest, 16 and 15, respectively, extends upwards from the sides of the seat 20. A head rest 11 is provided extending from the top of the backrest 14. Footrests 21 extend from the front of the seat 20, and are angularly adjustable relative to the seat 20. Right and left thoracic rests 12 and 13, respectively, extend forward from an upper portion of the backrest 14, as do right and left pelvic rests 17 and 18, respectively, from a lower portion of the backrest 14. Finally an anterior wedge 19 is provided on the front upper surface of the seat 20.

The positioning of the backrest 14 relative to the seat 20, as well as the positioning of the remaining components: headrest 11, right and left thoracic rest 12 and 13, right and left arm rests 15 and 16, pelvic rests 17 and 18, anterior wedge 19, and footrests 21, can all be varied to achieve an optimum position for a patient, with regard to comfort, support and abilities.

Figure 4:
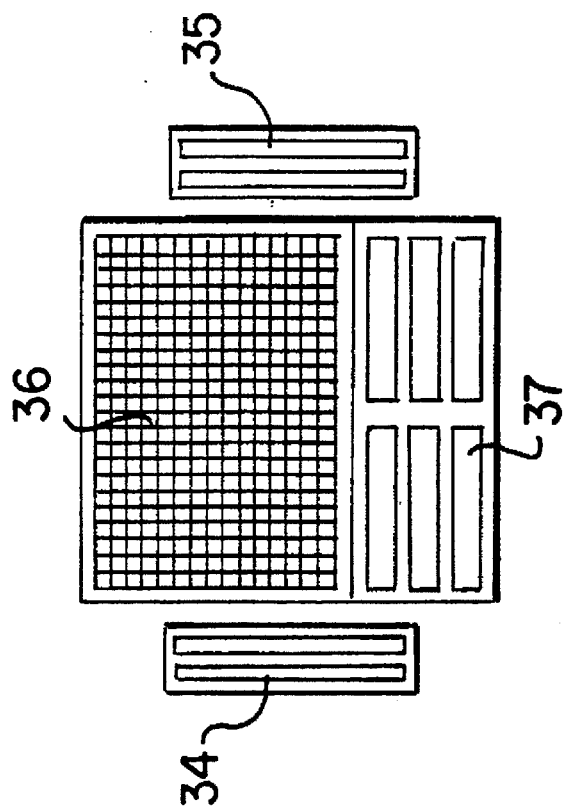
FIG. 4 is a top plan view of the sensors for the seat, armrests and anterior wedge for the seat of FIG. 1.
Figure 3:
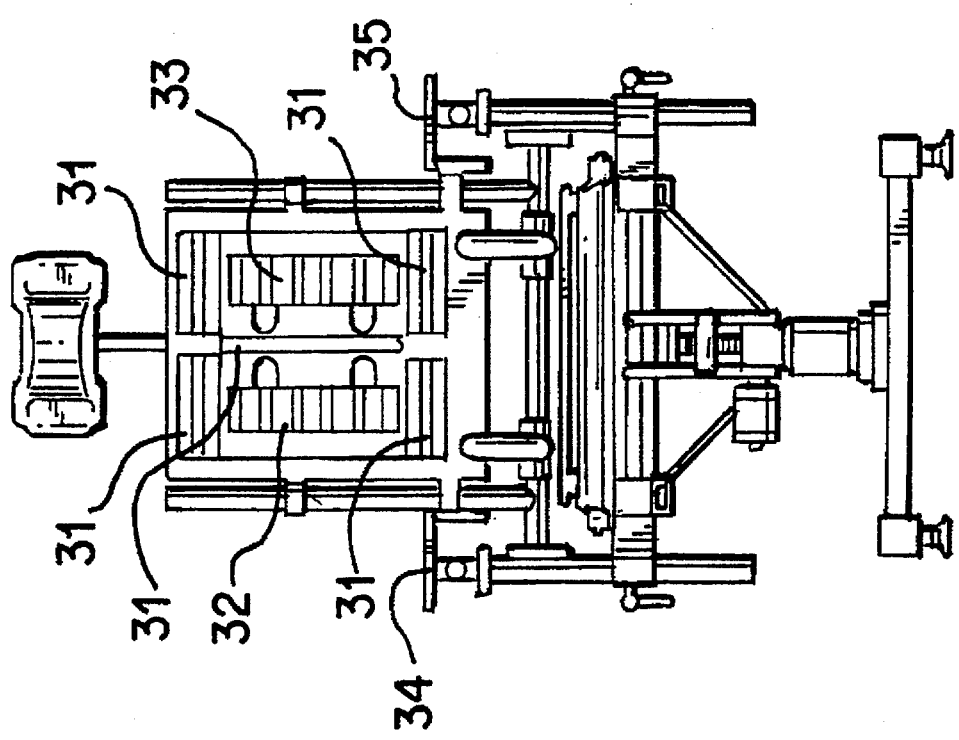
FIG. 3 is a front view of the chair shown in FIG. 1 showing the sensor components.

The chair has sensors in various components to develop data concerning the position of the patient and the orientation of the various components, as shown in FIGS. 3 and 4. Sensors 31 are located in the backrest 14. Sensors 32 are positioned in the right thoracic rest 12 and sensors 33 are positioned in the left thoracic rest 13. Right and left arm rest 15 and 16 have sensors 34 and 35 provided in them, respectively. The seat 20 has sensors 36 and anterior wedge 19 has sensors 37.

Figure 6:
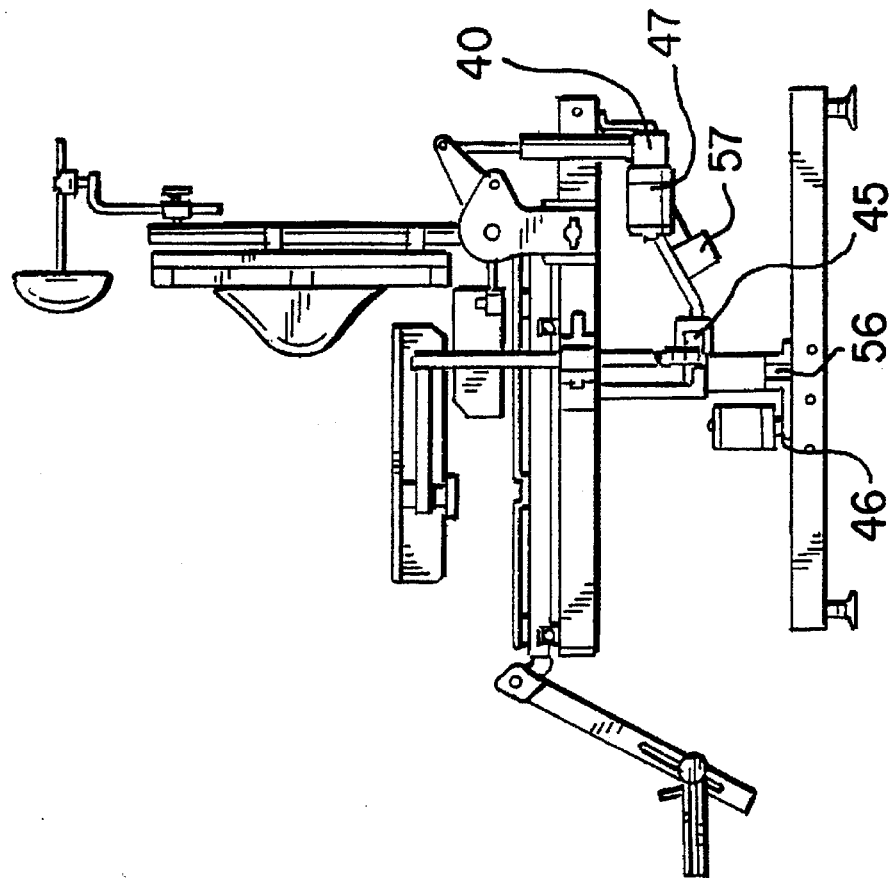
FIG. 6 is a side view of the chair shown in FIG. 5.
Figure 5:
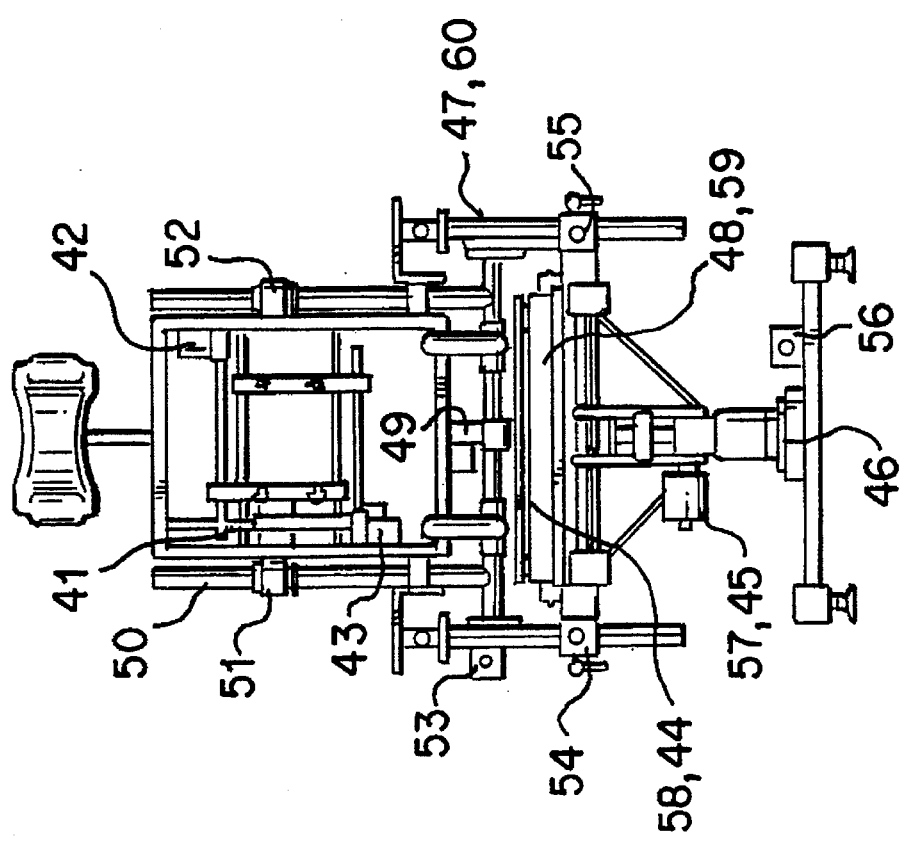
FIG. 5 is a front view of the chair shown in FIG. 1 showing the electro-mechanical components.

The third major system of the chair of the present invention, is shown in FIGS. 5 and 6, includes a series of actuators and transducer for controlling the movement and position of the various mechanical components of the chair. The actuators control the position of each of the components and the transducers aid in the calculation of the displacement of each component, whether in terms of angle, or distance or both. An actuator 41 is provided in the backrest 14 to control its height. An actuator 42 and transducer 51 control the position of the right thoracic rest 12 and an actuator 43 and transducer 52 control the position of the left thoracic rest 13. The position of the anterior wedge 19 is controlled by an actuator 44 and transducer 58.

The position of the seat 20 is controlled by three actuators and two transducers. The angle of the seat 20 relative to the ground is controlled by an actuator 45 and transducer 57. The height of the seat from the ground is controlled by actuator 46 and transducer 56, and distance, or depth, the seat 20 extend from the backrest 14 is controlled by actuator 48 transducer 59.

The angle of the backrest 14 relative to the seat 20 is controlled by actuator 47 and transducer 60. The position of the right and left pelvic rests 17 and 18, respectively, are controlled by transducer 53, and by actuator 49.

While many devices can be used as the sensors, the preferred sensors are force detector resistive components which are comparable to diaphragm-type commutators, or switches. However, unlike diaphragm-type commutators, the resistance decreases as the force applied to the force detector resistive components increases. For example, a human finger exerting a resistance of from 1N to 10N generates a continuous variance in resistance from 400 kilo ohms to 40 kilo ohms. The force detector resistive components are ideal for use in the chair of the present invention which utilizes touch sensitive sensors, as they are relatively inexpensive, are thin, less than 1, 5 mm thick, are durable, and can be used in a wide range of environments, as they are intrinsically insensitive to electromagnetic influences and they do not themselves generate interference. The force detector resistive components are available in matrix type arrays, or in individual elements having maximum dimensions of 55 cm by 75 cm, with force sensing capabilities of 20–30 grams to 20–30 kilograms.

Figure 7A:
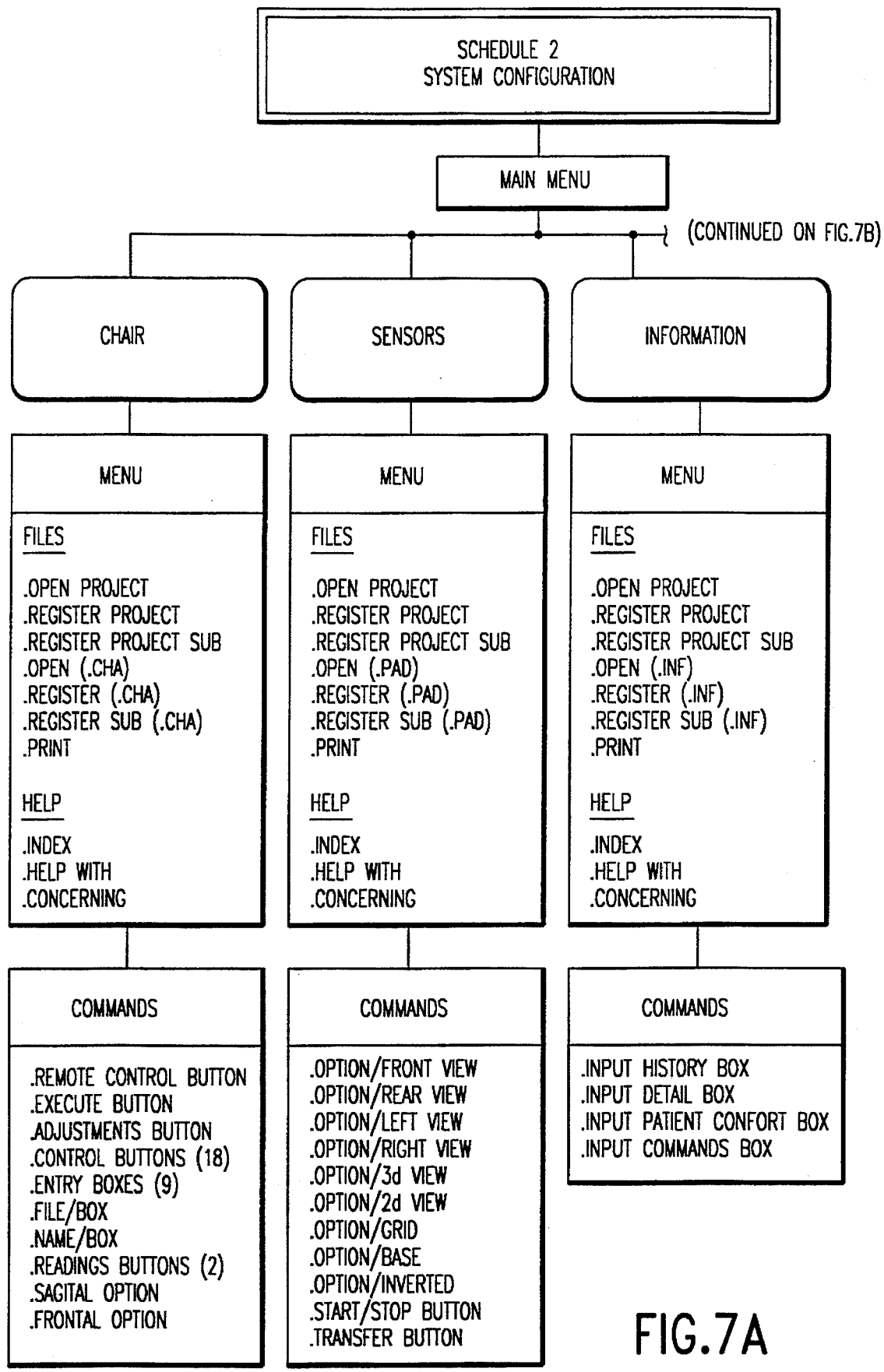
FIG. 7 is a flow chart for operation of the chair according to the present invention.
Figure 7B:
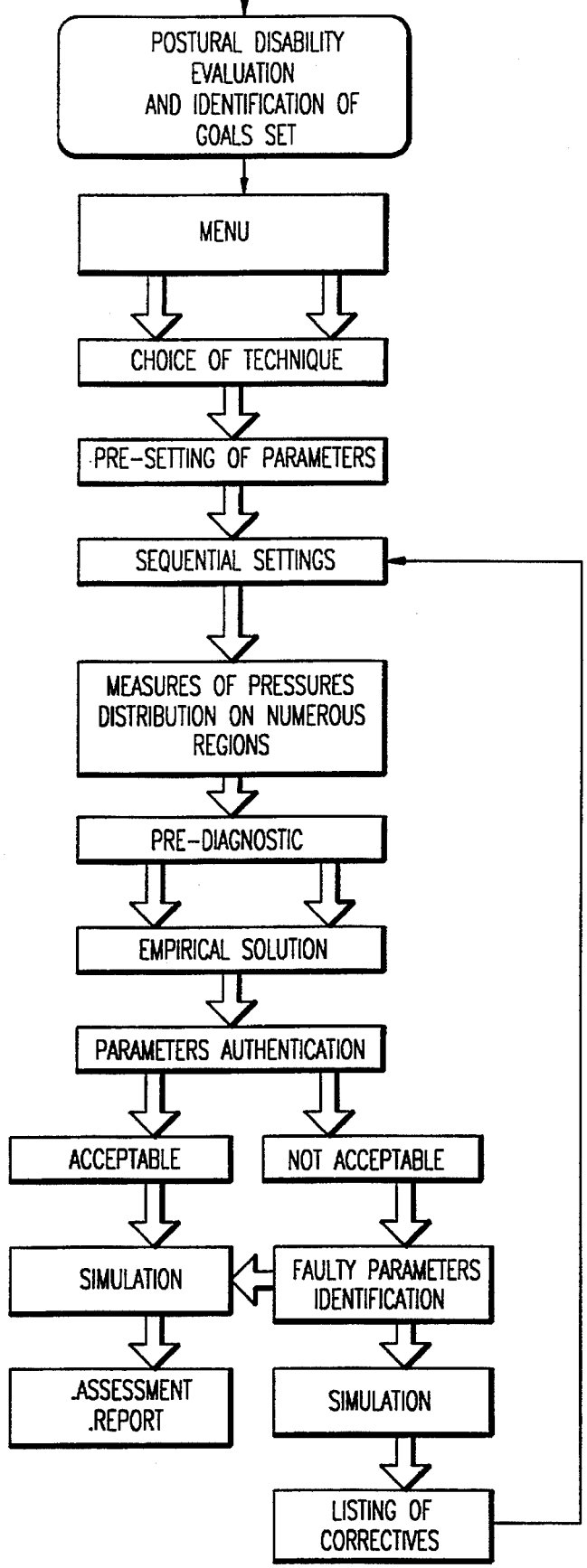
Figure 7C:
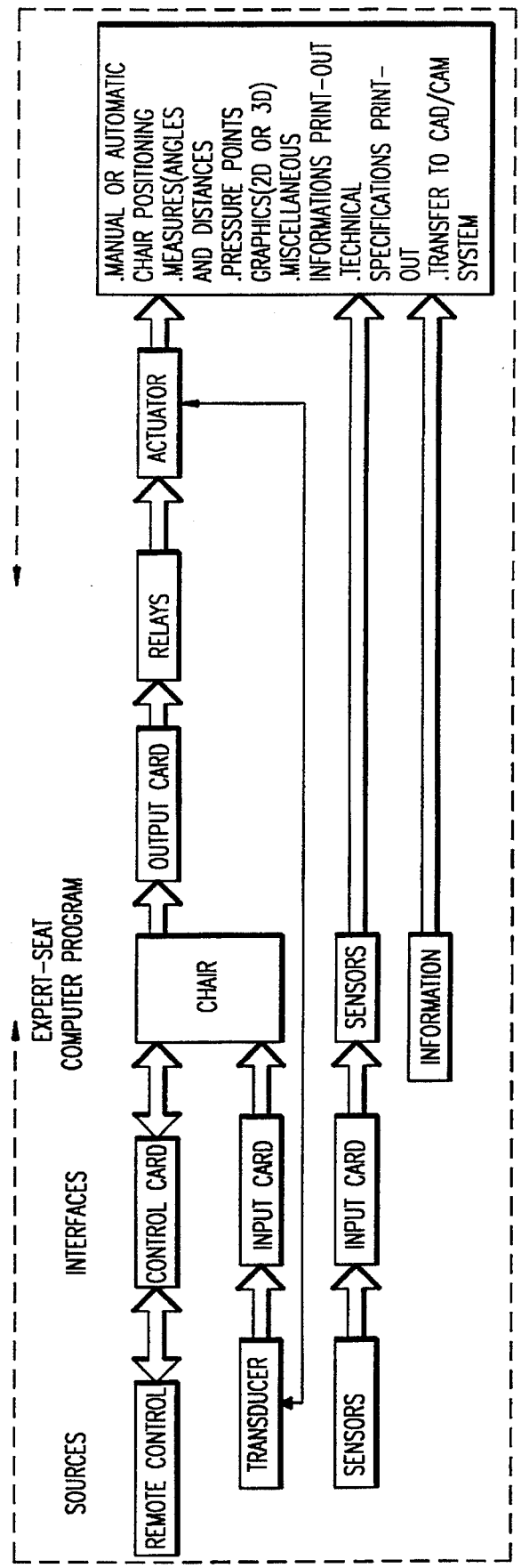
Figure 8:
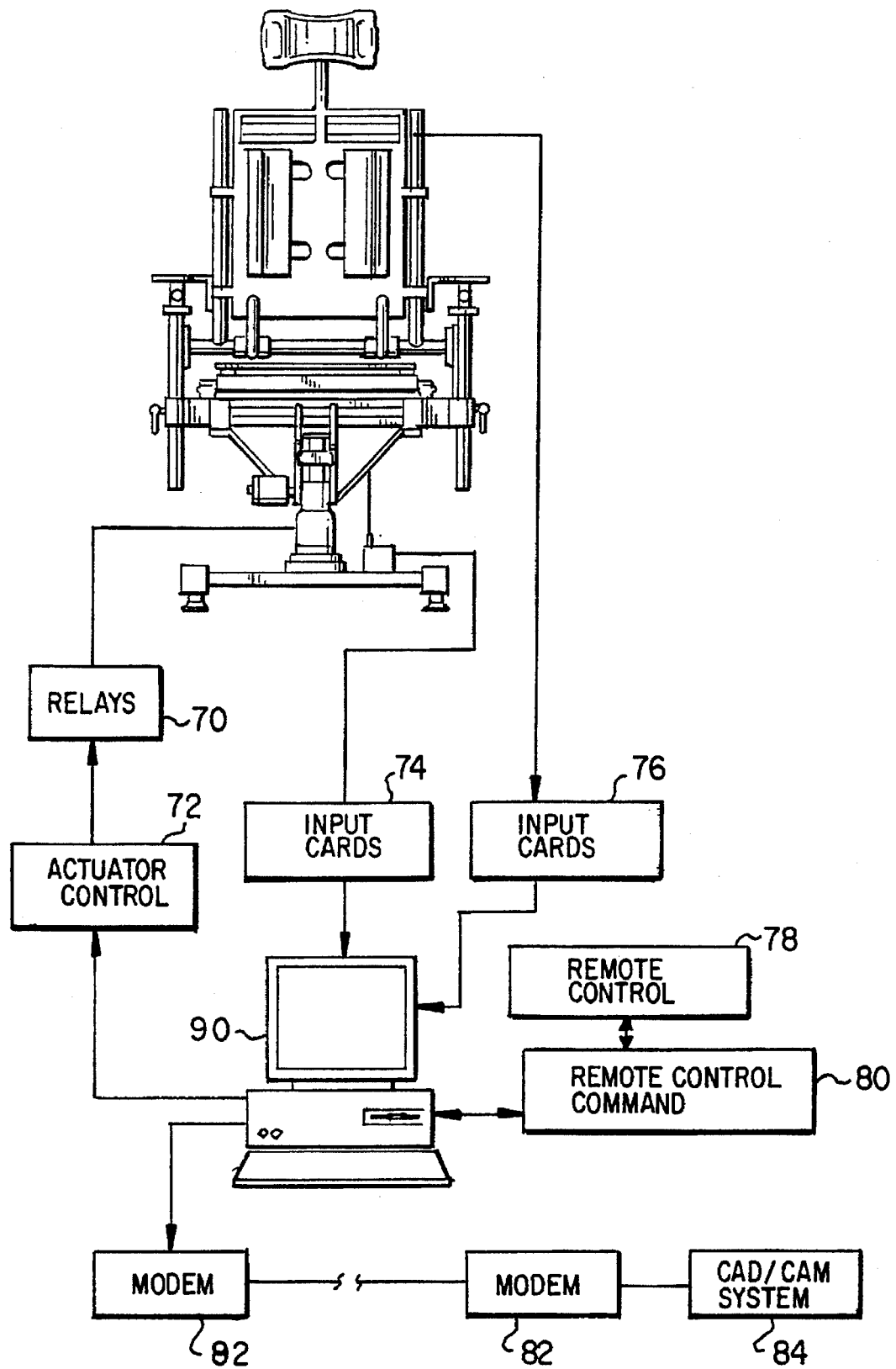
FIG. 8 is a front view of the chair shown in FIG. 1 showing the operational components.

The operation of the chair of the present invention will now be described with reference to FIGS. 7 and 8. After a patient sits in the chair, the various components are adjusted to achieve a comfortable position. The adjustment of the components can be performed by an operator, or alternatively, the patient can adjust the components using a remote control 78. The remote control is connected to a computer 90 through a remote control command module 80. If the patient is using the remote control 78, signals from the remote control are fed to the control module 80 and the computer 90 to instruct an actuator control 72 to activate one or more of the actuators and/or transducers via relays 70. If an operator is adjusting the position of the various components, the signals for controlling the actuators are generated directly at the computer 90.

The remote control allows the user to affect the spatial positioning of the components the same way an operator would use the same program. The computer program allows for the input of information relating to which specific components are to be utilized in the chair conception.

The various sensors, actuators and transducers send signals back to the computer 90 through input card 76 and 74. The optimum positioning of the various components is determined by trial and error and discussion with the patient. When the computer 90 is first activated, information concerning the patient is inputted. The patients postural disability is evaluated and the goals to be achieved are determined. The technique for achieving the goals for the patient are chosen and preset parameters are produced after which sequential settings are developed. The pressure distribution on the sensors of the chair are measured, and a prediagnostic is performed. The results of the prediagnostic are used in an empirical solution and the resulting parameters are authenticated. If the parameters are acceptable a simulation in produced and an assessment report generated. On the other hand, if the parameters are unacceptable, the faulty parameters are identified, a simulation is run, and corrective values are developed. The system then returns to the step of developing sequential settings and proceeds forward again.

The system measures the angles and distances, and can provide pressure point graphics in two or three dimensions. Hard copy print outs can be produced, and/or the information can be sent to a CAD/CAM system 84. The CAD/CAM system may be at a remote location, such as a manufacturing site, and connected by modems 82. The CAD/CAM system can then produce a chair for each patient tailored to each one's individual needs and dimensions.

Having described several embodiments of the in accordance with the present invention, it is believed that other modifications, variations and changes will be suggested to those skilled in the art in view of the description set forth above. For example, the present invention is equally applicable to wheelchairs, beds, ortheses, prostheses, corsets and feet. It is therefor to be understood that all such variations, modifications and changes are believed to fall within the scope of the invention as defined in the appended claims.

What is claimed is:

1. An apparatus for positioning a human body comprising:

a support having a plurality of adjustable components;

a plurality of sensors disposed on said support;

a plurality of actuators and transducers for moving said plurality of components relative to one another, a computer for controlling said support, said computer receiving output from said plurality of sensors and said plurality of actuators and transducers, and sending control signals to said actuators and transducers to adjust positions of said plurality of components, based upon said output from said plurality of sensors, said plurality of actuators and transducers, and data stored in said computer, said data comprising information concerning said human body to be positioned, positioning techniques, and presetting parameters.

2. An apparatus as recited in claim 1, wherein said plurality of components comprise:

a seat, a backrest, a head rest, an anterior wedge, a pair of armrests, a footrest, a pair of pelvic rests, and a pair of thoracic supports.

3. An apparatus as recited in claim 1, wherein said computer provides an output to a fabrication device to produce a chair based upon the positioning of said human body in said apparatus.

4. An apparatus as recited in claim 1, wherein said plurality of sensors are force detector resistive components in which resistance decreases as force applied to said force detector resistive components increases.

5. An apparatus as recited in claim 2, wherein said backrest is angularly and vertically adjustable relative to said seat.

6. An apparatus as recited in claim 2, wherein said headrest is vertically adjustable.

7. An apparatus as recited in claim 2, wherein said foot rest is angularly adjustable.

8. An apparatus as recited in claim 2, wherein said pair of pelvic rests are adjustable toward and away from said backrest.

9. An apparatus as recited in claim 2, wherein said pair of thoracic rests are adjustable toward and away from said backrest.

10. An apparatus as recited in claim 2, wherein said anterior wedge is vertically adjustable from said seat.

11. An apparatus as recited in claim 2, wherein said backrest is vertically adjustable relative to said seat, and said seat is adjustable toward and away from said backrest.

12. An apparatus for positioning a human body comprising:

a body support having a plurality of adjustable components;

a plurality of sensors disposed on said body support;

a plurality of actuators and transducers for moving said plurality of components relative to one another;

a computer for controlling said body support, said computer receiving output from said plurality of sensors and said plurality of actuators and transducers, and sending control signals to said actuators and transducers to adjust positions of said plurality of components, based upon said output from said plurality of sensors, said plurality of actuators and transducers, and data stored in said computer, said data comprising information concerning said human body to be positioned, positioning techniques, presetting parameters, wherein said computer provides an output to a fabrication device to produce a body support based upon the positioning of said human body in said apparatus, and wherein said plurality of sensors are force detector resistive components in which resistance decreases as force applied to said force detector resistive components increases.

13. An apparatus for positioning a human body comprising:

a support having a plurality of adjustable components;

a plurality of sensors disposed on said support;

a plurality of actuators and transducers for moving said plurality of components relative to one another;

a computer for controlling said body support, said computer receiving output from said plurality of sensors and said plurality of actuators and transducers, and sending control signals to said actuators and transducers to adjust positions of said plurality of components, based upon said output from said plurality of sensors, said plurality of actuators and transducers, and data stored in said computer, said data comprising information concerning said human body to be positioned, positioning techniques, and presetting parameters, wherein said plurality of components comprise:

a seat, a backrest, a head rest, an anterior wedge, a pair of armrests, a footrest, a pair of pelvic rests, and a pair of thoracic supports, wherein said computer provides an output to a fabrication device to produce a body support based upon the positioning of said human body in said apparatus, and wherein said plurality of sensors are force detector resistive components in which resistance decreases as force applied to said force detector resistive components increases.

14. An apparatus as recited in claim 13, further comprising a remote control so that a user can activate said apparatus while positioned on said apparatus.

15. An apparatus as recited in claim 1, further comprising a remote control so that a user can activate said apparatus while positioned on said apparatus.

16. An apparatus as recited in claim 12, wherein said body support to be fabricated is one of a wheel chair, bed, ortheses, protheses, corset and foot support.

17. A method of positioning a human body comprising the steps of:

providing a support having a plurality of adjustable components for supporting a human body;

sensing said human body with a plurality of sensors disposed on said support;

adjusting a position of said plurality of components using a plurality of actuators and transducers; and controlling said adjusting step utilizing a computer for controlling said support, said computer receiving output from said plurality of sensors and said plurality of actuators and transducers, said computer sending control signals to said actuators and transducers to adjust positions of said plurality of components, based upon said output from said plurality of sensors, said plurality of actuators and transducers, and data stored in said computer, said data comprising information concerning said human body to be positioned, positioning techniques, and presetting parameters.

18. A method of positioning a human body as recited in claim 17, further comprising the additional step of sending an output to a fabrication device to produce a chair based upon the positioning of said human body in said apparatus.

19. A method of positioning a human body as recited in claim 17, wherein said adjusting step further comprising the additional steps of:

angularly adjusting and vertically adjusting a backrest relative to a seat, vertically adjusting a headrest, angularly adjusting a foot rest, adjusting a pair of pelvic rests toward and away from said backrest, adjusting a pair of thoracic rests toward and away from said backrest, vertically adjusting an anterior from said seat, vertically adjusting a backrest relative to said seat, and adjusting seat toward and away from said backrest.

20. An apparatus as recited in claim 13, wherein said plurality of components comprise a seat, a backrest, a head rest, an anterior wedge, a pair of armrests, a footrest, a pair of pelvic rests, and a pair of thoracic supports, wherein said backrest is angularly and vertically adjustable relative to said seat, said headrest is vertically adjustable, said foot rest is angularly adjustable, said pair of pelvic rests are adjustable toward and away from said backrest, said pair of thoracic rests are adjustable toward and away from said backrest, said anterior wedge is vertically adjustable from said seat, and said backrest is vertically adjustable relative to said seat, and said seat is adjustable toward and away from said backrest.

21. An apparatus as recited in claim 1, wherein said computer measures pressure distribution on regions of said support, runs a pre-diagnostic, develops an empirical solution, authenticates parameters of said solution, and runs simulations until acceptable parameters are produced.

22. An apparatus as recited in claim 12, wherein said computer measures pressure distribution on regions of said support, runs a pre-diagnostic, develops an empirical solution, authenticates parameters of said solution, and runs simulations until acceptable parameters are produced.

23. An apparatus as recited in claim 13, wherein said computer measures pressure distribution on regions of said support, runs a pre-diagnostic, develops an empirical solution, authenticates parameters of said solution, and runs simulations until acceptable parameters are produced.

24. An method as recited in claim 17, wherein said computer measures pressure distribution on regions of said support, runs a pre-diagnostic, develops an empirical solution, authenticates parameters of said solution, and runs simulations until acceptable parameters are produced.

* * * * *